United States Patent [19]

Hartmann

[11] Patent Number: 5,897,207
[45] Date of Patent: *Apr. 27, 1999

[54] BEVERAGE TEMPERATURE NOTIFICATION DEVICE

[76] Inventor: Clay A Hartmann, 5438 Ridgedale, Dallas, Tex. 75206

[ * ] Notice: This patent issued on a continued prosecution application filed under 37 CFR 1.53(d), and is subject to the twenty year patent term provisions of 35 U.S.C. 154(a)(2).

[21] Appl. No.: 08/802,317

[22] Filed: Feb. 18, 1997

[51] Int. Cl.$^6$ ................................................ G01K 13/00
[52] U.S. Cl. ................. 374/150; 374/149; 340/870.17; 116/216
[58] Field of Search .................................. 374/150, 157, 374/149, 141; 116/216; 340/584, 870.17

[56] References Cited

U.S. PATENT DOCUMENTS

| | | | |
|---|---|---|---|
| 2,236,243 | 3/1941 | Cornelius | 374/141 |
| 2,319,101 | 5/1943 | Anderson . | |
| 2,983,247 | 5/1961 | Greenspon | 116/216 |
| 3,282,105 | 11/1966 | Smith | 116/216 |
| 3,582,921 | 6/1971 | Krieger | 340/870.17 |
| 3,864,976 | 2/1975 | Parker | 374/150 |
| 3,959,787 | 5/1976 | Messmann et al. | 340/586 |
| 4,217,477 | 8/1980 | Matsubara et al. | 374/149 |
| 4,377,733 | 3/1983 | Yamaguchi et al. | 374/149 |
| 4,555,040 | 11/1985 | Butenshcön | 374/141 |
| 4,712,095 | 12/1987 | Georgis, II | 340/584 |
| 4,747,413 | 5/1988 | Bloch | 340/870.17 |
| 4,763,112 | 8/1988 | Hsieh | 340/584 |
| 4,800,371 | 1/1989 | Arsi | 340/593 |
| 4,930,902 | 6/1990 | Yata et al. | 374/150 |
| 4,994,792 | 2/1991 | Ziegler, Jr. | 340/584 |
| 5,000,581 | 3/1991 | Yata et al. | 374/150 |
| 5,482,373 | 1/1996 | Hutchinson | 374/141 |
| 5,575,563 | 11/1996 | Chiu et al. | 374/157 |
| 5,678,925 | 10/1997 | Garmaise et al. | 374/150 |

FOREIGN PATENT DOCUMENTS

| | | | |
|---|---|---|---|
| 0476124 | 5/1929 | Germany | 374/150 |
| 0134479 | 10/1979 | Japan | 374/149 |
| 405344926 | 12/1993 | Japan | 374/149 |
| 0296385 | 5/1965 | Netherlands | 374/150 |
| 0311038 | 5/1929 | United Kingdom | 374/150 |
| 091007736 | 5/1991 | WIPO | 340/870.17 |

Primary Examiner—Joseph L. Felber

[57] ABSTRACT

A beverage temperature notification device comprising a thermosensor, a sleeve, a temperature indicator, and a remote coupling. The thermosensor determines the actual or approximate temperature of the beverage. The sleeve attaches the thermosensor to the beverage's container. The temperature indicator provides a signal that the temperature of the beverage has reached the predetermined preferred temperature. The remote coupling is used to couple the thermosensor and the temperature indicator, so that the signal indicating that the beverage has reached the desired temperature is provided remotely to where the beverage is heated or cooled.

10 Claims, 1 Drawing Sheet

5,897,207

BEVERAGE TEMPERATURE NOTIFICATION DEVICE

FIELD OF THE INVENTION

The present invention relates generally to temperature measurement. In particular, a method and apparatus are disclosed for the remote notification that a beverage has reached a predetermined preferred temperature.

BACKGROUND OF THE INVENTION

It is often desirable that a beverage be served at a preferred temperature. For example, soda and beer are often served cold, and baby's milk and hot chocolate are often served hot. It is not always the case, however, that a particular beverage is available at a desired temperature. For example, one may purchase from a store soda or beer that has not been chilled. To enable more immediate consumption, one may want to cool such a beverage at a rapid rate by placing it in the freezer. While this has the desirable effect of rapidly cooling the beverage, there is the undesirable consequence that, if placed in the freezer too long, the beverage may freeze and, through expansion of the frozen liquid, cause the beverage's container to burst or rupture. As a second example, one may want to rewarm or prepare milk for a baby by placing the beverage in a microwave or within a pan of boiling water on a stove. However, it milk is boiled too long, it will curdle and become unusable. Thus, for both the beverage placed in the freezer and the beverage placed in the microwave/over the stove, there is a need to provide notification that such beverage has reached a predetermined temperature prior to undesirable effects that result from continued cooling or warming of such beverage for longer periods.

It is known that a temperature measuring device may be incorporated into a beverage container or associated with such a container. For example, in U.S. Pat. No. 5,000,581, a baby bottle is disclosed in FIG. 10 of that patent, which includes a temperature indicator, buzzer, signal processor, and wiring united with the bottle. When the milk in the bottle is heated to a predesired temperature, the buzzer sounds. However, if the bottle was placed in a closed area, such as a microwave, the buzzer could not be reliably heard. In addition, the association of the electronic elements with the bottle may interfere with the operation of the microwave and cause other problems.

It is also known that temperature measuring devices may be associated with closed spaces. For example, U.S. Pat. No. 3,959,787 discloses a refrigerator alarm for signaling an improperly high temperature in a refrigerated container such as a freezer. The device includes a thermostat mounted within the refrigerated container and an alarm device mounted outside the container for providing a signal based on the inner temperature of the container. This device, however, is unable to indicate the temperature of a particular item placed in the container, such as a bottle or can. In addition, the device is intended as a warning device to indicate that the container is not providing the intended refrigeration function; it is not intended to provide a warning that the excess refrigeration is being provided to a particular item in the container.

Thus, there is an unmet need for providing a beverage temperature measuring device for indicating that a beverage has reached a predetermined temperature, where the temperature indication is provided remotely to the beverage being heated or cooled. This enables the use of a closed container or some other remote means, such as a freezer, oven, stove, or microwave, to provide rapid temperature regulation of the beverage without the need for a person to continuously monitor the progress of the temperature regulation function.

BRIEF SUMMARY OF THE INVENTION

The present invention satisfies this unmet need to provide a method and apparatus for the remote notification that a beverage has reached a predetermined preferred temperature. The beverage temperature measuring device includes a thermosensor, a sleeve, a temperature indicator, and a remote coupling.

BRIEF DESCRIPTION OF THE DRAWINGS

The foregoing advantages of the invention are more apparent from the drawings in which.

DETAILED DESCRIPTION

Figure 1:
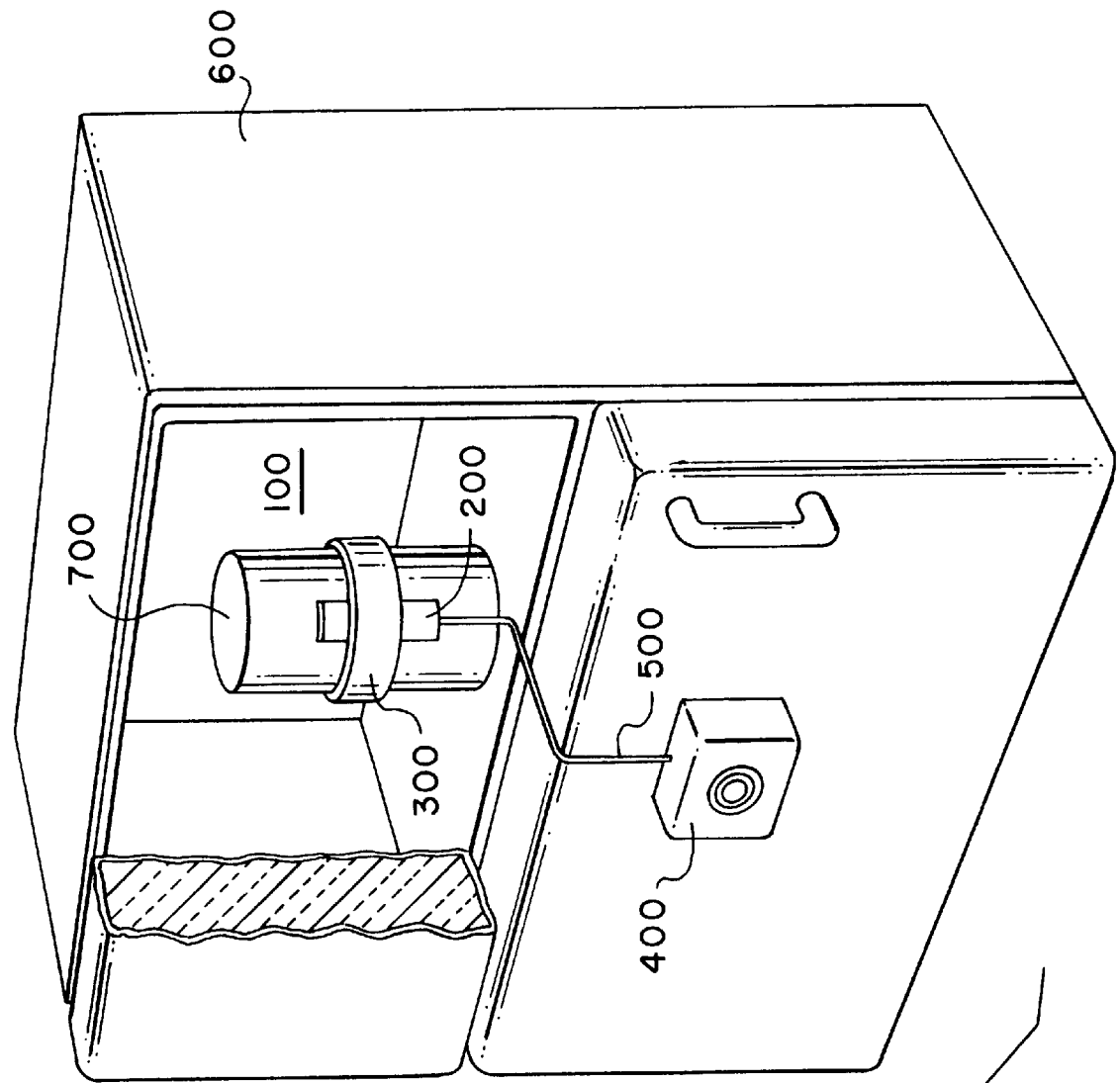
FIG. 1 shows a beverage temperature measuring device of the present invention.

The foregoing advantages of the present invention are more fully apparent from this description of a preferred embodiment of the invention. FIG. 1 shows beverage temperature measuring device 100, which includes thermosensor 200, sleeve 300, temperature indicator 400, and remote coupling 500. The device is placed in freezer 600 to cool rapidly the beverage contained in container 700 to a predetermined temperature, at which time temperature indicator 400 provides remote notice, outside freezer 600, that the beverage has been properly cooled. In this way, person 800 does not need to continuously monitor container 700 to ensure that it does not burst or rupture due to excessive cooling after its contents have reached the predetermined preferred temperature.

Thermosensor 200 determines the actual or approximate temperature of the beverage, and may be any element capable of determining the temperature of the body or liquid to which it is attached. For cooling a beverage, thermosensor 200 must be capable of recognizing that the body or liquid to which it is attached is at or about the beverage's freezing point, typically zero degrees centigrade. For heating a beverage, thermosensor 200 must be capable of recognizing that the body or liquid to which it is attached is at or about the beverage's boiling point, typically one-hundred degrees centigrade.

Sleeve 300 attaches thermosensor 200 to container 700, which holds the beverage. If container 700 is a can, bottle or some other closed container, sleeve 300 may be a velcro or elastic strip, band, cup, holder or equivalent device that keeps thermosensor 200 in proximity to container 700. For a glass, aluminum, or equivalent container, the surface temperature of container 700 will approximate the temperature of its beverage contents in known ways. Thus, the temperature of thermosensor 200 attached to the container may be used to determine the temperature of the beverage contents. If container 700 is a mug, glass, or other open container, sleeve 300 may be a clip, strap or equivalent device that positions thermosensor 200 in the beverage contents. Thus, the temperature of thermosensor 200 will be the temperature of the beverage.

Temperature indicator 400 provides a signal that the temperature of the beverage has reached the predetermined preferred temperature. This indicator may include an audio signal, such as a beep, alarm, buzzer, or song, as well as a visual signal such as a flag, light, or other visual signal in addition to, or as an alternative to, the audio signal. Temperature indicator 400 includes circuitry for determining when the temperature of thermosensor 200 reaches the predetermined preferred temperature. The audio or visual signal will be activated at this time or after an appropriate delay, if needed, based on the thermal properties arising from the nature of container 700 and the attachment of thermosensor 200. Thermosensor 200 or temperature indicator 400 may include circuitry for setting a predetermined preferred temperature, or one or more predetermined preferred temperatures may be preset in device 100. Temperature indicator 400 may also include a selector mechanism to choose between audio and visual methods of alerting or signaling the user that the beverage has reached the predetermined preferred temperature.

Remote coupling 500 is used to couple thermosensor 200 to temperature indicator 400, so that the signal indicating that the beverage has reached the desired temperature is provided remotely to freezer 600. Remote coupling 500 may be either a wired or wireless coupling. In the simplest embodiment of the invention, remote coupling 500 will be a wire between thermosensor 200 and temperature indicator 400 to provide temperature information remotely to temperature indicator 400 and its associated processing means. In this embodiment, remote coupling 500 may include a magnet, velcro, glue, or equivalent structure for affixing temperature indicator 400 to the outside surface of the freezer door. In a more complex embodiment of the invention, remote coupling 500 may comprise a wireless system for communicating to temperature indicator 400 either the temperature of thermosensor 200 or the fact that thermosensor 200 has reached the predetermined preferred temperature.

While the invention has been shown in FIG. 1 with respect to freezer 600, any other rapid heating or cooling device may be used, such as an oven or microwave. It is also within the scope of the present invention to use a natural source of temperature regulation, such as a snow bank or other hot or cold environment. In such an embodiment, temperature indicator 400 may be kept indoors, while the beverage chills in an uncomfortable outdoor environment. It is anticipated that a long-life battery will provide power to the unit, and that one or more elements of the device will be modified to accept and display a logo of a sponsoring company. It is believed that sleeve 300 and/or temperature indicator 400 provide the best portion of the apparatus for the addition of a long-life battery or logo display. Other modifications and enhancements to the invention may be made, and other embodiments of the invention may be built, without departing from the scope of the invention as claimed below.

The invention claimed is:

1. A device used solely in combination with a beverage in a container for signaling that said beverage has reached a predetermined preferred temperature, said device comprising:

a thermosensor for measuring the temperature of said beverage in said container;

a sleeve coupled to said container for positioning said thermosensor proximate to said beverage;

a temperature indicator associated with said thermosensor for signaling that said beverage has reached said predetermined preferred temperature; and a remote coupling for positioning said temperature indicator remotely from said thermosensor, said sleeve, said beverage, and said container, wherein said remote coupling is sized to enable said temperature indicator to be positioned exterior to a refrigerator and to enable said thermosensor, said sleeve, said beverage and said container to be positioned interior to the refrigerator.

2. The device of claim 1, wherein said temperature indicator further comprises means for adjusting said predetermined preferred temperature.

3. The device of claim 1, wherein said temperature indicator further comprises means for selecting between at least two signals for signaling that said beverage has reached said predetermined preferred temperature.

4. The device of claim 1, wherein said remote coupling further comprises means for affixing said temperature indicator to a surface.

5. The device of claim 4, wherein said means for affixing said temperature indicator to a surface is a magnet.

6. A beverage temperature notification system, comprising:

a beverage in a container; and a device used solely for signaling that said beverage in said container has reached a predetermined preferred temperature, said device comprising:

a thermosensor for measuring the temperature of said beverage in said container;

a sleeve coupled to said container for positioning said thermosensor proximate to said beverage;

a temperature indicator associated with said thermosensor for signaling that said beverage has reached said predetermined preferred temperature; and a remote coupling for positioning said temperature indicator remotely from said thermosensor, said sleeve, said beverage, and said container, wherein said remote coupling is sized to enable said temperature indicator to be positioned exterior to a refrigerator and to enable said thermosensor, said sleeve, said beverage and said container to be positioned interior to the refrigerator.

7. The system of claim 6, wherein said temperature indicator further comprises means for adjusting said predetermined preferred temperature.

8. The system of claim 6, wherein said temperature indicator further comprises means for selecting between at least two signals for signaling that said beverage has reached said predetermined preferred temperature.

9. The system of claim 6, wherein said remote coupling further comprises means for affixing said temperature indicator to a surface.

10. The system of claim 9, wherein said means of affixing said temperature indicator to a surface is a magnet.

* * * * *